(12) United States Patent
Helstab

(10) Patent No.: US 6,542,586 B1
(45) Date of Patent: Apr. 1, 2003

(54) TEXT MESSAGING WITH EMBEDDED TELEPHONY ACTION KEYS

(75) Inventor: Edmond J. Helstab, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,643

(22) Filed: Dec. 27, 1999

(51) Int. Cl.[7] .............................................. H04M 11/00
(52) U.S. Cl. .............................. 379/93.19; 379/93.17; 379/93.23; 379/142.01
(58) Field of Search ........................ 379/93.23, 93.17, 379/93.19, 93.21, 142.01, 142.13, 142.17

(56) References Cited

U.S. PATENT DOCUMENTS 5,450,069 A * 9/1995 DiSanto et al. .......... 379/93.19
5,461,666 A * 10/1995 McMahan et al. ........ 379/93.23
6,192,116 B1 * 2/2001 Mayak ..................... 379/93.23
6,292,548 B1 * 9/2001 Jreij et al. ................ 379/93.23
6,310,944 B1 * 10/2001 Brisebois et al. ........ 379/93.23

* cited by examiner

Primary Examiner—Stella Woo
(74) Attorney, Agent, or Firm—Gibbons, Del Deo, Dolan, Griffinger & Vecchione

(57) ABSTRACT

A telephony system allows a calling party to provide Call Context Identification (CCID) in conjunction with a voice telephone call. When a called party's telephone device is in its ringing state or in a call waiting alerting state, the CCID is displayed to the called party to aid the called party in determining whether to answer the call. The system allows a calling party to embed actions in text messages. Such actions are displayed on the called party's telephone device as action keys. Selection of these action keys results in performing an action defined by the calling party.

15 Claims, 2 Drawing Sheets

TEXT MESSAGING WITH EMBEDDED TELEPHONY ACTION KEYS

FIELD OF THE INVENTION

This invention relates generally to communications, and more particularly to providing a called party with a selection of telephony actions the called party may take in response to an incoming message.

BACKGROUND OF THE INVENTION

Currently a called party may determine the calling party's telephone number, and possibly the caller's name, etc. However, the called party is unable to determine the context of a call (e.g., topic, importance, likely duration, etc.) before answering it. Because of this lack of call context information, the called party may answer the incoming telephone call and inappropriately disrupt a higher-priority task (e.g., a meeting, another telephone call, etc.). Similarly, the called party may inappropriately leave an urgent telephone call unanswered (e.g., the called party may fail to disrupt a telephone conversation to answer an incoming call with an unknown caller id, even though the incoming call is from the called party's spouse who has just been in a car accident). If the called party had been provided with information regarding the context of the incoming call, the called party could have made a more informed decision as to whether or not to answer the incoming call.

Text messages indicating context of an intended call can currently be delivered to pagers or wireless telephones with SMS (Short Message Service) capability. However, these messages are not delivered in conjunction with an incoming call; these messages are provided instead of an incoming telephone call. In the case of a pager, these messages require the recipient to find a voice-capable device with which to contact the calling party and in the case of both pagers and SMS-capable wireless phones the opportunity for an immediate voice connection is lost. This can lead to a lost opportunity to speak with the calling party. Thus, it would be advantageous to employ a text message in conjunction with an incoming telephone call, which could provide the called party with at least some context of the incoming telephone call.

Further, a text message may include one or more requests to perform one or more actions, (e.g., "Call me at my Mom's house", "Call the conference bridge to join a telephone conference", call my pager or leave a message on my answering machine," etc.). Currently a recipient of such a text message must read the text message and manually initiate the requested actions. It would be more convenient to provide the recipient with the ability to automatically initiate the requested action by pressing a key or combination of keys on the telephone device. This could increase productivity and reduce response time in critical situations.

Advantages of the invention will become apparent to those skilled in the art from the following description thereof.

SUMMARY OF THE INVENTION

The present invention provides systems and methods for transmitting specifications for actions to be taken by a called party prior to the called party answering an incoming telephone call from the calling party.

An embodiment of the present invention provides a method of providing a called party terminal with a selection of one or more responses prior to said called party answering the incoming call. The method includes transmitting a specification for at least one action to the called party terminal prior to the called party answering the incoming call. The specification includes at least one automated action for the called party to invoke.

Another aspect of the invention provides a telephony device including a receiving module for receiving an embedded telephony action with an incoming telephone call. The telephony device includes a display module for displaying a representation of the embedded telephony action prior to the incoming telephone call being answered.

Another aspect of the invention provides a communications device including a receiver configured to receive at least one embedded action specification prior to the communications device answering an incoming connection request. The communications device also includes a processor electrically connected to the receiver and configured to convert data received into a displayable format. The communications device also includes a display electrically connected to the processor.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

Figure 1:
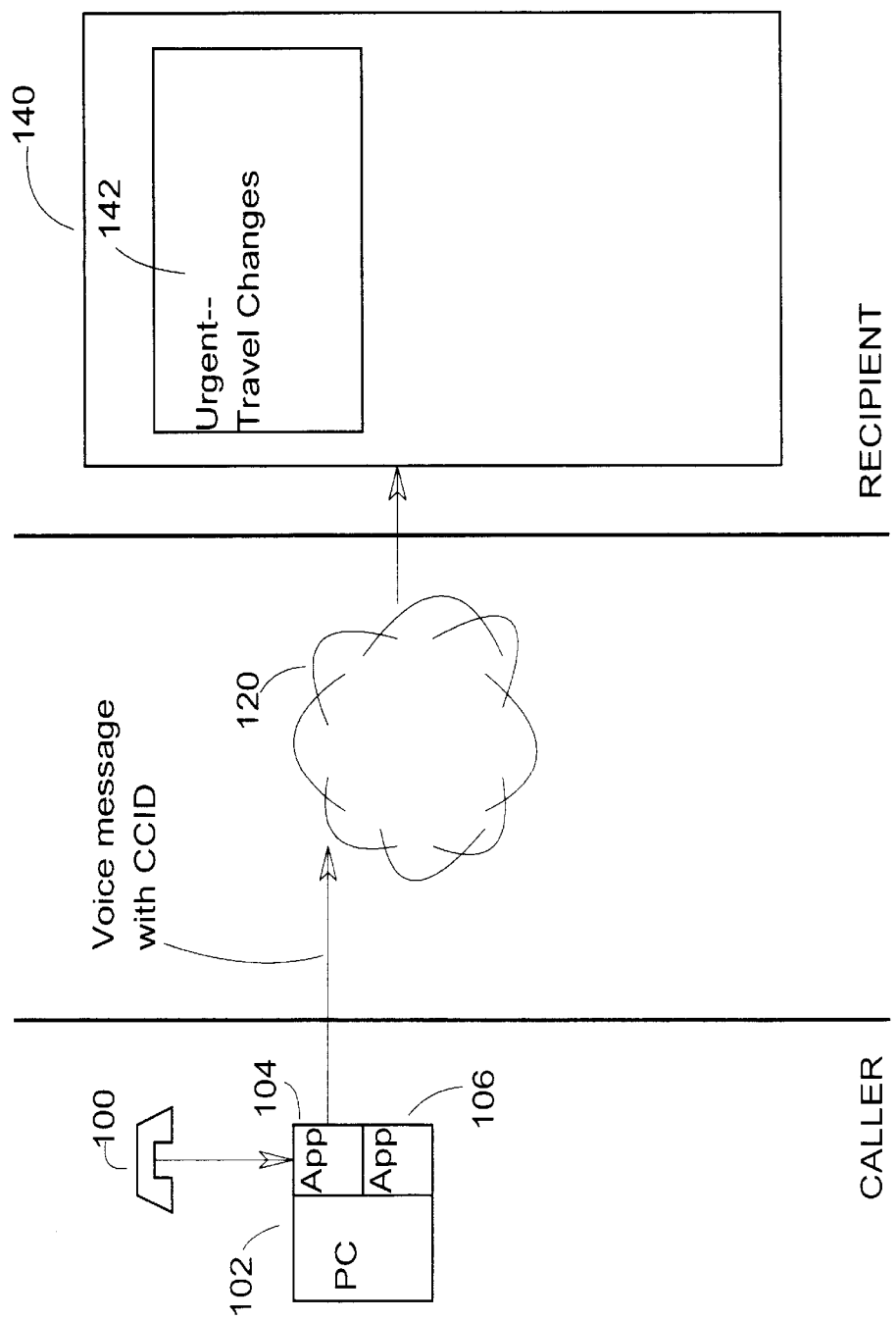
FIG. 1 depicts an embodiment of the present invention transmitting a voice message containing Call Context Identification information according to the present invention.

The present invention enables a called party to receive one or more soft-key functions or variable-function hard-key functions for display prior to the called party's answering an incoming call. For example, prior to answering an incoming telephone call, the called party's terminal could display a soft key, which enables the called party to speed dial an embedded telephone number, feature code, access code, etc., or any combination thereof. A soft key typically is implemented as an icon displayed on a screen, which has touch-screen capability and can detect a user's finger "pressing" the soft key. A variable-function hard key is typically located proximate to the display, and an icon or text on the display proximate to a hard key indicates an action currently associated with that key. Further, it is possible that the called party's terminal includes a graphical user interface (GUI) which requires a pointing device to activate a function represented by an icon on the GUI. Thus, the icon would be equivalent to a soft-key.

The present invention may be employed with wireless telephones, wireline telephones, webphones, computers with telephone capabilities, telephones with computer capabilities, etc.

Modern telephone communication equipment often includes computer-telephony integration (CTI) capabilities. Call Context Identification (CCID) provided by the present invention builds upon the concepts of CLID, SCWID and Calling Party Name Display (CPND). Utilizing the CTI capabilities, a calling party located at a PC utilizes a CTI application to enter context information, or telephony action specifications for display by the called party terminal of the call (either or both of these features will be referred to as CCID). Those skilled in the art will recognize that the context information could be announced instead of or in conjunction with being displayed, but for ease of description only the display aspect will be discussed.

Prior to answering a call, or instead of answering the call, the called party may view the selection of (one or more) actions to take. When a call is delivered to a called party's device (e.g., the call is announced either by ringing if the called phone is not already in use or by a call waiting tone if it is already in use), the telephony actions will appear on the called party's terminal either with or instead of caller identification information. As with caller Id, the action information may be transmitted during the quiet period between ring signals.

The calling party may define potential responses for the called party, which are transmitted as embedded telephony actions. The action keys, and the actions associated with the action keys are captured in a local buffer. After receipt of the embedded telephony action, the called party's telephone device will display an action key as either a soft-key or a variable function hard key and the called party may select an action key. This will cause the device to initiate the action associated with the selected action key. Typical actions could be to dial a phone number provided as part of the action (e.g., to return a call to the sender of the message, or to call a third party), to send a response message (e.g., unavailable to talk now, etc.), to connect to a conference call, to run a local or remote program, etc. Thus, the embedded telephony actions might include telephone numbers to be dialed (e.g., the calling party's telephone number, a conference bridge number, etc.), time-sensitive passwords, conference or transfer functions, an application, or a file launch point in a PC-based computer telephony application, etc.

These responses can be delivered to an individual, to multiple users simultaneously, or to multiple users in a staggered manner (i.e., the response could include an instruction (hidden or viewable to call the next person on the list, etc.). The message can be generated by an individual or automatically by a CTI application.

Figure 2:
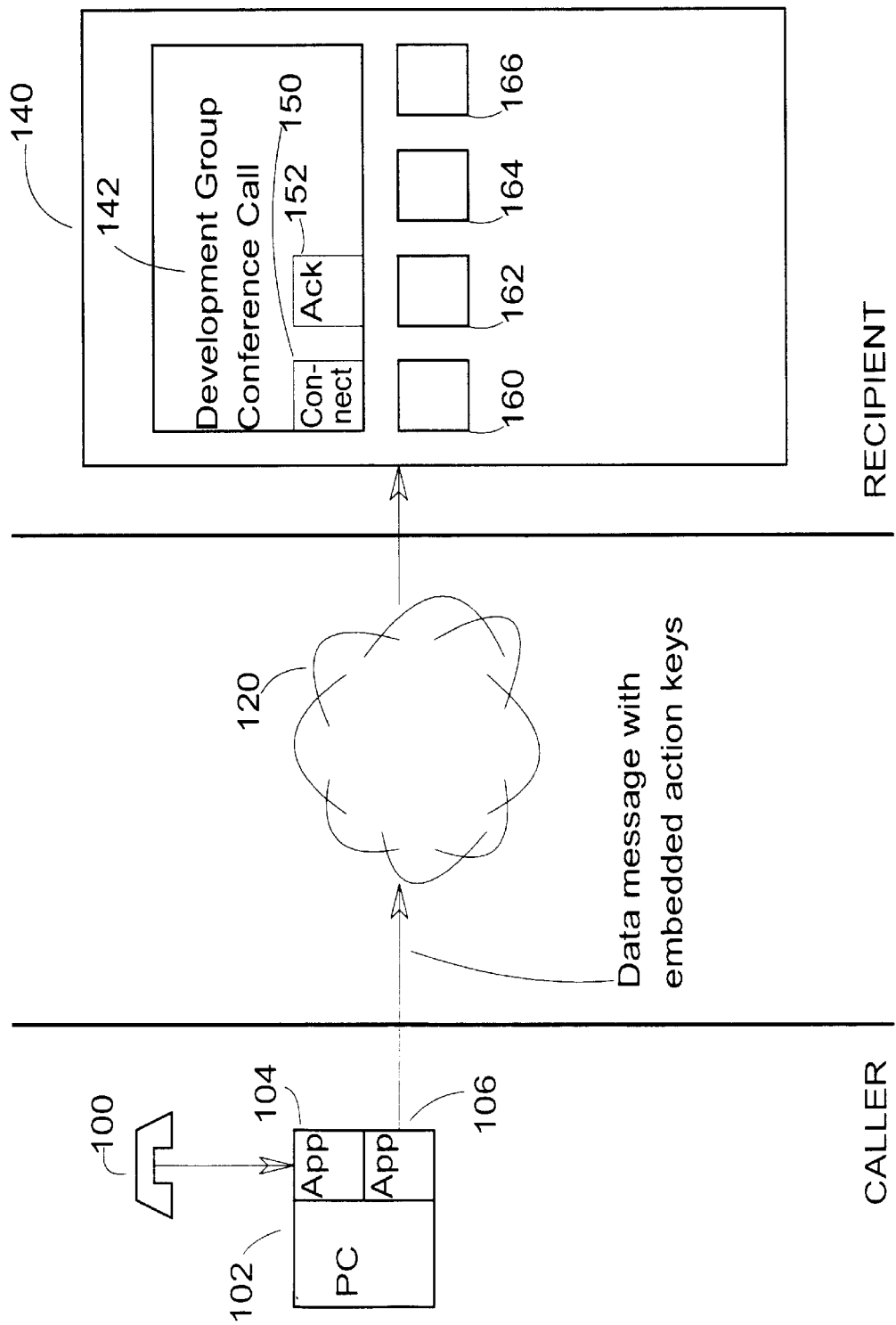
FIG. 2 depicts an embodiment of the present invention transmitting embedded action key information according to the present invention.

FIG. 2 illustrates transmission of a message with embedded actions according to the present invention. Those skilled in the art will realize that the message may be a null message or a text message. For example, if a conference call is a recurring event and its participants expect to be summoned to it at a known time, the appearance of actions such as CONNECT and ACKNOWLEDGE suffices without a supporting message announcing the conference call. However, a request to "call the calling party back as soon as possible may require an added text message to that effect. Those skilled in the art will appreciate that other equipment besides a PC may be used to produce a data message with embedded action keys, such as a webphone, etc., and this equipment could be employed with various communication platforms such as automatic call delivery (ACD) systems, etc.

FIG. 1 depicts an embodiment of the present invention, which includes a text message. A calling party has a communications device 100 and a PC 102. The PC 102 runs a variety of applications, including a CTI application 104, which accepts input via the PC, of CCID information pertaining to a communication being originated. Application 104 forwards the call from telephone device 100 and the appended CCID information to network 120, which in turn forwards it to a called party's telephone device 140. Those skilled in the art will appreciate that other equipment may be employed to produce a voice message with CCID appended, such as a "webphone," etc.

The telephone device 140 is typically equipped with conventional telephone features such as a speaker, microphone, and keypad (not shown). Telephone device 140 is also equipped with display screen 142. In an alternate embodiment, display screen 142 may be an adjunct device. When a call arrives, display 142 displays caller ID information and/or the CCID information entered into CTI Application 104 by the caller (here assumed by way of example to be "Urgent—Travel Changes"). The recipient may then decide whether to answer the call. Those skilled in the art will realize that the CCID information could be displayed automatically, or could require action on the part of the recipient (e.g., pressing a button). Those skilled in the art will also realize that the CCID information may be transmitted during silent periods between ring signals, as is conventional caller ID.

A calling party at PC 102 may wish to set up a conference call for members of a group (e.g., "Development Group"). The caller may invoke CTI application 106 to forward a message to each member of the group which will display the text "Development Group Conference Call", and which has two embedded actions—CONNECT and UNAVAILABLE. If however, the conference call is a recurring event (e.g. every Monday morning), then the caller my simply send the embedded actions. When the message is received at user telephony device 140, the provided text is displayed on display 142, as are two actions 150 (CONNECT) and 152 (UNAVAILABLE). Depending on the capabilities of telephony device 140, if display screen 142 can function as a touch screen then actions 150 and 152 may be displayed as soft keys. Otherwise actions 150 and 152 may be displayed adjacent variable-function hard keys 160 and 162 respectively (160 for CONNECT, 162 for UNAVAILABLE). Pressing the CONNECT key typically dials a phone number (provided in the caller's message) of the conference bridge, while pressing the UNAVAILABLE key could dial another provided number that logs this recipient as presently occupied and unable to participate in the conference. Recipients who press neither can be assumed to be away from their telephone devices 140 and thus also unavailable to participate in the conference call.

It will thus be seen that the invention depicted in FIGS. 1 and 2 provides a call recipient with information concerning the context of an incoming call and/or possible actions defined by the sender of the message.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

For example in alternate embodiment, incoming calls without CCID may be answered at a front-end position (e.g., a reception) where context information is extracted manually or automatically (e.g. by speech recognition). The calls are then forwarded, with CCID appended, to an intended recipient.

It is also to be understood that the following claims are intended to cover all of the generic and specific features of the invention as described herein, and all statements of the scope of the invention which, as a matter of language, might be said to fall therebetween.

Having described the invention what is claimed as new and secured by Letters Patent is:

1. A method of providing a plurality of called party terminals with a selection of one or more responses prior to at least one of said called parties answering the incoming call, comprising:

simultaneously transmitting a specification for at least one action to a plurality of said called party terminals prior to at least one of said called parties answering said incoming call;

wherein said specification includes at least one automated action for said called parties to invoke.

2. The method according to claim 1 further including:

transmitting caller identification information to said at least one of said called party terminals prior to said at least one called party answering said incoming call.

3. The method according to claim 1 further including:

transmitting a plurality of specifications to said plurality of called party terminals.

4. The method according to claim 1 wherein said at least one automated action is associated with a key on each of said called party terminals.

5. The method according to claim 4, wherein said association includes displaying a representation of said action on a touch-screen on at least one of said plurality of called party terminals.

6. The method according to claim 4 wherein said association comprises displaying a representation of said action on a display proximate a key of said called party terminals.

7. The method according to claim 1 wherein said specification is sequentially transmitted to said plurality of called party terminals.

8. A telephony device comprising:

receiving means for receiving an identical embedded telephony action with an incoming telephone call; and an adjunct display means for displaying a representation of said embedded telephony action prior to said incoming telephone call being answered.

9. The telephony device according to claim 8 further comprising:

a variable-function hard key configured to initiate said action received by said receiving means.

10. The telephony device according to claim 8 wherein:

said adjunct display means is configured initiate said action in response to a touch of said display means.

11. The telephony device according to claim 8 further comprising:

caller identification receiving means for receiving caller identification information.

12. A communications device comprising:

a receiver configured to receive at least one embedded action specification prior to said communications device answering an incoming connection request, a processor electrically coupled to said receiver and configured to convert data received into a displayable format; and, an adjunct display coupled to said processor.

13. The communications device according to claim 12 wherein said display comprises a touch screen.

14. The communications device according to claim 12 further comprising at least one variable-function hard key in electrical communication with said display.

15. The communications device according to claim 12 wherein said adjunct display further comprises at least one variable-function hard key in electrical communication with said display.

* * * * *